United States Patent [19]
Yasufuku et al.

[11] Patent Number: 5,318,826
[45] Date of Patent: Jun. 7, 1994

[54] INFORMATION RECORDING MEDIUM COMPRISING A SILVER NALIDE LIGHT SENSITIVE LAYER, AND TWO SUPERPOSED MAGNETIC LAYERS WHICH DIFFER IN COERCIVITY

[75] Inventors: Yoshitaka Yasufuku; Yasuhisa Yamauchi; Koichi Nagayasu, all of Tokyo, Japan

[73] Assignee: Konica Corporation, Japan

[21] Appl. No.: 893,406

[22] Filed: Jun. 3, 1992

[30] Foreign Application Priority Data

Jun. 10, 1991 [JP] Japan .................................. 137824

[51] Int. Cl.$^5$ .............................................. G11B 05/00
[52] U.S. Cl. .................................... 428/212; 428/213; 428/323; 428/329; 428/336; 428/340; 428/694 BM; 428/694 BH; 428/694 BB; 428/900; 430/140; 430/496; 430/523
[58] Field of Search ................ 428/694, 900, 694 BM, 428/694 BH, 694 BB, 212, 213, 323, 329, 336, 340; 354/76, 105; 430/140, 496, 523

[56] References Cited

U.S. PATENT DOCUMENTS

| | | | |
|---|---|---|---|
| 3,986,205 | 10/1976 | Fayling | 360/2 |
| 4,259,392 | 3/1981 | Suzuki | 428/212 |
| 4,270,853 | 6/1981 | Hatada et al. | 354/76 |
| 4,400,457 | 8/1983 | Johnson | 430/140 |
| 4,511,617 | 4/1985 | Hideyama et al. | 428/212 |
| 4,624,894 | 11/1986 | Kishimoto | 428/328 |
| 4,743,490 | 5/1988 | Fayling | 428/212 |
| 4,977,040 | 12/1990 | Yano et al. | 428/692 |
| 5,043,210 | 8/1991 | Yamakawa et al. | 428/323 |
| 5,132,715 | 7/1992 | Taillie | 354/105 |

Primary Examiner—Stevan A. Resan
Attorney, Agent, or Firm—Jordan B. Bierman

[57] ABSTRACT

Disclosed is an information recording medium comprising:
a base having a first surface and a second surface;
a light-sensitive layer provided on said first surface of said base; and
a plurality of magnetic layers provided on said second surface of said base, wherein a coercive forces of said magnetic layers are different from each other.

An information recording medium according to this invention is capable of recording a variety of information in plural magnetic layers classifying the information by the degree of significance.

6 Claims, 3 Drawing Sheets

INFORMATION RECORDING MEDIUM COMPRISING A SILVER NALIDE LIGHT SENSITIVE LAYER, AND TWO SUPERPOSED MAGNETIC LAYERS WHICH DIFFER IN COERCIVITY

FIELD OF THE INVENTION

This invention relates to an information recording medium. More specifically, this invention relates to an information recording medium capable of recording a variety of information in plural magnetic layers classifying the information by the degree of significance.

BACKGROUND OF THE INVENTION

There has been proposed an information recording medium comprised of a photographic film bearing a magnetic layer. For example U.S. Pat. No. 4,947,196 and International Patent Provisional Publication No.90/04254 disclose a roll type photographic film bearing on its backside a magnetic layer containing a magnetic substance for magnetic recording and a photographying camera having a magnetic head. These techniques enable to improve the quality of prints and the efficiency of printing work by inputting to and outputting from the magnetic layer identification information on the light-sensitive material and its manufacturer, information on shooting conditions, information on printing conditions, and information concerning conditions for additional printing.

In these conventional techniques, however, the magnetic layer is made up of a single layer; therefore, every information is recorded in pieces in the longitudinal direction on the same plane, without any means to distinguish significance of information. To users (consumers in general), for example, the dates, places, and purposes (motives) of shooting are constantly important information, while manufacturer information such as that on film identification or printing conditions is no longer necessary once the film is developed to form images.

Accordingly, there are demanded such magnetic layers as are capable of retaining significant information permanently erasing disused information easily.

OBJECT OF THE INVENTION

The object of this invention is to provide an information recording medium having a silver halide light-sensitive layer on one side of a support and plural magnetic layers on the other side, which is capable of distinguishing the significance of information recorded on the magnetic layers, erasing easily disused information and retaining significant information in a hardly vanishing state.

CONSTITUTION OF THE INVENTION

The above object of the invention is achieved by either (1) an information recording medium having a light-sensitive layer containing silver halide on one side of a support and at least two magnetic layers on the other side, wherein said at least two magnetic layers have coercive forces different from each other, or (2) an information recording medium having a light-sensitive layer containing silver halide on one side of a support and at least two magnetic layers on the other side, wherein the coercive force of magnetic powder contained in said at least two magnetic layers is different between the two layers.

Such difference in coercive forces between at least two magnetic layers can be achieved by use of magnetic powders having different coercive forces. To have the magnetic layers different in coercive forces, it is desirable that the coercive forces of magnetic powders used in respective layers be different 100 oersteds or more.

It is a desirable mode that the upper magnetic layer is thinner than the lower magnetic layer as it enhances the effect of the invention.

The total thickness of all the magnetic layers is preferably 1.5 $\mu$m or less, and the thickness of the upper layer is preferably 0.5 $\mu$m or less.

It is preferable that the binder (resin) used in the invention contain a modified resin having a polar group selected from —$SO_3M$, —$OSO_2M$ and —$P(=O)(OM_1)(OM_2)$(Where M represents a hydrogen, lithium, sodium or potassium atom; $M_1$ $M_2$ each represent a hydrogen, lithium, sodium or potassium atom, or an alkyl group; and $M_1$ $M_2$ may be the same or different.)

Suitable binder resins include vinyl chloride resins, polyurethane resins, polyester resins, and polyethylene resins. Various methods can be applied to modify these resins. For example, a polyester resin containing metal sulfonate groups can be obtained by using a dicarboxylic acid having a metal sulfonate group as part of the acid component and condensing it, together with a dicarboxylic acid having no metal sulfonate group, with a diol.

A polyester polyurethane resin containing metal sulfonate groups can be obtained through a condensation reaction and an addition reaction using a diisocyanate and the three starting materials of the above polyester resin containing metal sulfonate groups, namely, a dicarboxylic acid having a metal sulfonate group, a dicarboxylic acid having no metal sulfonate group and a diol. A modified polyurethane resin can be prepared, for example, by introducing a metal sulfonate group into a diol which is used for polyurethane resin synthesis.

Another possible method is to introduce a polar group by modifying a polyester, polyurethane or vinyl chloride resin.

That is, it is a method to introduce the above polar group by condensing a compound having the above polar group and chlorine, such as $ClCH_2CH_2SO_3M$, $ClCH_2CH_2OSO_2M$, or $ClCH_2P(=O)(OM_1)(OM_2)$(Where M, $M_1$ and $M_2$ are the same as the above), with one of these resins through dehydrochlorination.

Examples of the above carboxylic acid component used for making a polyester resin and a polyurethane resin include aromatic dicarboxylic acids such as terephthalic acid, isophthalic acid, orthophthalic acid and 1,5-naphthalic acid; aromatic hydroxycarboxylic acids such as p-(hydroxyethoxy) benzoic acid; aliphatic dicarboxylic acids such as succinic acid, adipic acid, azelaic acid, sebacic acid and dodecane di-carboxylic acid; tri- and tetra-carboxylic acids such as trimellitic acid, trimesic acid and pyromellitic acid. Among these, the preferred are terephthalic acid, isophthalic acid, adipic acid and sebacic acid.

Examples the above dicarboxylic acid component having a metal sulfonate group include 5-sosium sulfo isophthalic acid, 5-potassium sulfo isophthalic acid, 2-sodium sulfo isophthalic acid and 2-potassium sulfo terephthalic acid.

Examples of the above diol component include ethylene glycol, propylene glycol, 1,3-propanediol, 1,4-butanediol, 1,5-pentanediol, 1,6-hexanediol, neopenthyl glycol, diol, ethylene glycol, dipropylene glycol, 2,2,4-trimethyl-1,3-neopentane diol, 1,4-cyclohexanedimethanol, ethylene oxide adducts of bisphenol A, ethylene oxide adducts of hydrogenated bisphenol A, polyethylene glycols, polypropylene glycols and polytetramethylene glycols. Further, triols and/or tetraols, such as trimethylol ethane, trimethylol propane, glycerin, pentaerythritol, can be jointly used.

Examples of the above isocyanate component used to obtain the polyurethane resin include 2,4-tolylenediisocyanate, p-pheylenediisocyanate, m-phenylenediisocyanate, 3,3'-dimethoxy-4,4'-biphenylendiisocyanate, 4,4'-diisocyanate diphenyl ether, 1,3-naphthalenediisocyanate, pdinediisocyanate, mdinediisocyanate, p-xylidinediisocyanate mxylidinediisocyanate, methylcyclohexane-1,3-diisocyanate, 1,4-methylcyclohexane diisocyanate, 4,4'-diisocyanate dicyclohexane, 4,4'-diisocyanate dicyclohexyl methane and isophorone diisocyanate.

In the invention, at least two magnetic layers are comprised of a binder dispersing a ferromagnetic powder in it. The amount of ferromagnetic powder coated is 10 mg or less, preferably 5 mg or less and especially 0.5 to 3 mg per 100 cm$^2$ in terms of the amount of iron.in As ferromagnetic powders, oxide type ferromagnetic powders are preferred for their high oxidation resistance. Examples of such ferromagnetic powder include $\gamma$-Fe$_2$O$_3$ powder, Co-Coated $\gamma$-Fe$_2$O$_3$ powder, Co-Coated Fe$_3$O$_4$ powder, Co-Coated FeOX (4/3<X<3/2) powder, other iron oxides containing Co, and other types of ferrites such as hexagonal ferrites including Ba ferrite, Sr ferrite, Pb ferrite and Ca ferrite of M-type or W-type and their solid solutions and ion substitution products.

Among hexagonal ferrite magnetic powders, the preferred are those represented by the following Formula:
Formula: AO n(Fe$_{1-m}$M$_m$)$_2$O$_3$
In the formula, A represents at least one element selected from Ba, Sr, Ca and Pb; M represents at least one element selected from Zn, Co, Ti, Ni, Mn, In, Cu, Gd, Nb, Sn, Zr, Hf and Al; m represents an integer of 0 to 2; and n represents a number from 5.4 to 6.0. When M is a bivalent element or a quadrivalent or more polyvalent element, M is a combination of two or more kinds of elements of which average valency is 3.

It is preferable that these hexagonal ferromagnetic powders have crystal forms of hexagonal plates, that when the grain size is given by the diagonal length of the hexagonal plate, their average grain size be 0.005 to 0.3 $\mu$m, and that the ratio of diagonal length to thickness of the hexagonal plate, or an aspect ratio, be within a range of 2 to 10.

It is desirable that the coercive force (Hc) of the above ferromagnetic powder be 200 oersteds or more, especially 300 to 2000 oersteds.

The particle size of the magnetic powder is 0.3 $\mu$m or less, preferably 0.2 $\mu$m or less along the major axis.

The specific surface area of the magnetic powder measured by the BET method is generally 20 m$^2$/g more, preferably 25 to 80 m$^2$/g.

The form of the above ferromagnetic powder is particularly limited. Any of needle, spheroidal, platen, spindle and ellipsoidal particle forms can be used.

The coercive force of the magnetic layers used in the invention is 600 to 2000 oersteds for the uppermost layer, while it is 200 to 800 oersted for the lower layer. Also, it is desirable that the coercive force of the uppermost magnetic layer be greater than that of the lower layer by 100 oersteds or more, for the purpose of even more accurate distinction between information in the upper layer and lower layers.

In the invention, the magnetic layers may contain a fatty acid.

This fatty acid can be either a monobasic or dibasic acid, while the number of carbon atoms in the fatty acid is desirably 6 to 30, and more desirably 12 to 22.

Preferable fatty acids include caproic acid, caprylic acid, capric acid, lauric acid, myristic acid, palmitin acid, stearic acid, isostearic acid, linolenic acid, linolic acid, oleic acid, elaidic acid, behenic acid, malonic acid, succinic acid, maleic acid, glutaric acid, adipic acid, pimelic acid, azelaic acid, sebacic acid, 1,12-dodecane dicarboxylic acid and octane dicarboxylic acid.

Among these, particularly preferred ones are myristic acid, palmitin acid, oleic acid, and stearic acid.

Furthermore, a fatty acid ester, when contained in the magnetic layer, improves the running property and durability of the magnetic recording medium according to the invention by reducing the friction coefficient of the magnetic layer.

Examples of the above fatty acid ester include oleyl oleate, oleyl stearate, isocetyl stearate, dioleyl maleate, butyl stearate, butyl palmitate, butyl myristate, octyl myristate, octyl palmitate, amyl stearate, amyl palmitate, stearyl stearate, laulyl oleate, oxtyl oleate, isobutyl oleate, ethyl oleate, isotridecyl oleate, 2-ethyl hexyl stearate, 2-etthyl hexyl myristate, ethyl stearate, 2-ethyl hexyl palmitate, isopropyl palmitate, isopropyl myristate, butyl laurate, cetyl-2-ethyl hexalate, dioleyl adipate, diethyl adipate, diisobutyl adipate, and diisodecyl adipate. Among these, the preferred are butyl stearate and butyl palmitate.

These fatty acid esters can be used singly or in combination of two or more kinds.

Besides the above fatty acids or the fatty acid esters, other lubricants may be contained in the magnetic layer of the invention.

Examples of the other lubricants include silicone lubricants, fatty-acid modified silicone lubricants, rine-type lubricants, liquid paraffin, squalane, carbon black. These can be used either separately or in combination of two or more kinds.

As a binder, a transparent material such as cellulose ester or gelatin is used. A fine dispersion of magnetic particles can be prepared by dispersing these particles in such a transparent material with the aid of a solvent for the binder, such as an organic solvent for cellulose ester or water for gelatin.

As organic solvents for dispersing, kneading and coating magnetic particles, there can be used, at an arbitrary ratio, ketones such as acetone, methyl ethyl ketone, methyl isobutyl ketone, cyclohexanone, isophorone and tetrahydrofuran; alcohols such as methanol, ethanol, propanol, butanol, isobutyl alcohol, isopropyl alcohol and methyl cyclohexanol; esters such as ethyl acetate, butyl acetate, isobutyl acetate, isopropyl acetate, ethyl lactate, glycol monoethyl ether acetate; ethers such as diethyl ether, tetrahydrofuran, glycol dimethyl ether, glycol monoethyl ether and dioxane; tars (aromatic hydrocarbons) such as benzene, toluene, xylene, cresol, chlorobenzene and styrene; chlorinated hydrocarbons such as methylene chloride, ethylene chloride, carbon tetrachloride, chloroform, ethylene chlorohydrine and dichlorobenzene; and N, N-dimethylformaldehyde and hexane.

There is no particular constraint on the kneading method, the addition order of each component and other conditions can be set properly.

In preparing a magnetic paint, there can be used conventional kneading machines such as double-roll mill, triple-roll mill, ball mill, bevel mill, thoron mill, side grinder, Szegvari, attriter, high-speed impeller disperser, high-speed stone mill, high-speed impact mill, disper, kneader, high-speed mixer, ribbon blender, co-kneader, intensive mixer, tumbler, blender, disperser, homogenizer, single-axis screw extruder, double-axis screw extruder and ultrasonic disperser. The kneading and dispersing technique is detailed in "Paint Flow and Pigment Dispersion" by T. C. Patton, 1964, published by John Wiley & Sons, "Kogyo Zairyo" (Industrial Materials), Vol. 25, 37 (1977) by Shinichi Tanaka, and other literature quoted in the above publications. In practice, plural kneading machines are combined in order that a magnetic paint can be properly fed to a coater to support continuous processing. Relevant information can also be found in U.S. Pat. Nos. 2,581,414 and 2,855,156. In the present invention, a magnetic paint can be prepared through kneading and dispersion according to the method described in the above mentioned publications and literature quoted in them.

Before coating, a support may be subjected to treatment as corona discharge, plasma treatment, subbing, heat treatment, dust removal, metal deposition or alkali treatment. Detailed information on the support can be found, for example, in German Patent No. 3,338,854, Japanese Patent O.P.I. Publication No. 116926/1984, U.S. Pat. No. 4,388,368, "Sen'i to Kogyo" (Fiber and Industris) Vol.31, pp.50–55,1975, by Yukio Mitsuishi.

As binders used in the above mentioned magnetic layers, conventional thermoplastic resins, thermosetting resins, reactive resins and resins cured by electron beam irradiation are used as well as mixtures of these.

Preferable thermoplastic resins are those having a softening temperature of 150° C. or lower, an average molecular weight of 10,000 to 200,000 and a polymerization degree of 200 to 2,000. Examples of such thermoplastic resins include vinyl chloride resins, vinyl chloride-vinyl acetate copolymers, vinyl chloride-vinyliden chloride copolymers, vinyl chloride-acrylonitrile copolymers, acrylic ester-acrylonitrile copolymers, acrylic ester-vinyliden chloride copolymers, acrylic ester-styrene copolymers, methacrylic ester-acrylonitrile copolymers, methacrylic ester-vinyliden chloride copolymers, methacrylic ester-styrene copolymers, urethane elastomers, polyvinyl chlorides, vinyliden chloride-acrylonitrile copolymers, acrylonitrile-butadiene copolymers, polyamide resins, polyvinyl butyrals, cellulose derivatives (such as cellulose acetate butyrate, cellulose diacetate, cellulose triacetate, cellulose propionate, nitrocellulose, etc.) styrene-butadiene copolymers, polyester resins, chlorovinyl ether-acrylic ester copolymers, amino resins, various thermoplastic resins of synthetic rubber type, and mixtures thereof.

In the invention, it is preferable to use, as a binder (resin), a modified resin having a polar group selected from, $-COOH, -SO_3M, OSO_2M$ and $-P(=O)(OM_1)(OM_2)$ (Wherein M represents a hydrogen, lithium, sodium or potassium atom, $M_1$ and $M_2$ represent a hydrogen, lithium, sodium, or potassium atom, or an alkyl group, and $M_1 M_2$ be the same or different.) A transparent binder such as gelatin can be also used.

Suitable thermosetting resins and reactive resins are those which have a molecular weight of 200,000 or less when contained in a coating solution, and undergo a condensation or addition reaction on coating and drying to an infinite molecular weight. Among these resins, the preferred are those which neither soften nor melt before thermal decomposition. Suitable examples of such resins include phenol aldehyde resins, epoxy resins, curable polyurethane resins, urea resins, melamine resins, alkyd resins, silicone resins, acrylic reactive resins, mixtures of a high polymer polyester resin and an isocyanate prepolymer, mixtures of aester polyol and a polyisocyanate, urea-formaldehyde resins, mixtures of low molecular glycol/high polymer diol/triphenylmethane triisocyanate, polyamine resins, and mixtures thereof.

Examples of the electron beam curable resins include unsaturated prepolymers such as those of maleic anhydride type, urethane acryl type, epoxy acryl type, polyester acryl type, polyeter acryl type, polyurethane acryl type, and polyamide type; and multifunctional monomers such as those of ether acryl type, urethane acryl type, epoxy acryl type, phosphate acryl type, acryl type and hydrocarbon type.

These binders can be used singly or in combination, and other additives are added as required.

In this invention, it is desirable to use both a urethane resin and a vinyl chloride resin as the binder resin for the magnetic layers. It is also desirable that at least one of these be modified by the polar group. It is more desirable that every resin be modified.

In this invention, it is particularly preferable that the binder (resin) used for the magnetic layers have polar groups such as $-SO_3M -PO(OM_1)(OM_2)$ Mherein M represents a hydrogen, lithium, sodium or potassium atom, $M_1$ and $M_2$ each represent a hydrogen, lithium, sodium or potassium atom, or an alkyl group, and $M_1 M_2$ be the same or different.) in consideration of the dhesion between the magnetic layer and the support and between the magnetic layers themselves. It is desired that the coercive force of at least two magnetic layers be different from each other by 100 oersteds or more. Also, it is preferred that the magnetic layer for recording information to be long retained have a coercive force larger than that of the other layer in view of retainability of information.

A lubrication layer, like layer 122 shown in FIG. 1B of PCT Japanese Pat. O.P.I. Pub. No. W090/04254, may be provided on the magnetic layer comprised at least of two layers. In this invention, it is preferable the such a lubrication layer be not thicker than 0.1 μm in order to decrease input or output failures in recording or replaying. A material for the lubrication layer is a solution prepared by dissolving a fatty acid or a fatty acid ester in a solvent which is the same as, or similar to, that used for forming the magnetic layers. Such a layer can be formed by coating the liquid thus prepared on the magnetic layer (either simultaneously or sequentially while forming the magnetic layers, or after the magnetic layers are formed and dried).

Next, the function of the magnetic layer having alelayer configuration, the feature of the information recording medium of the invention, is described referring to figures.

A plan of the information recording medium according to this invention, viewed from the magnetic layer side.

FIG. 2

Sectional views of the information recording medium according to this invention: (a) showing the entire view, and (b) and (c) being enlarged sections of the magnetic layers.

FIG. 3

A schematic drawing showing how the information recording medium according to this invention is mounted on the camera.

Figure 1:
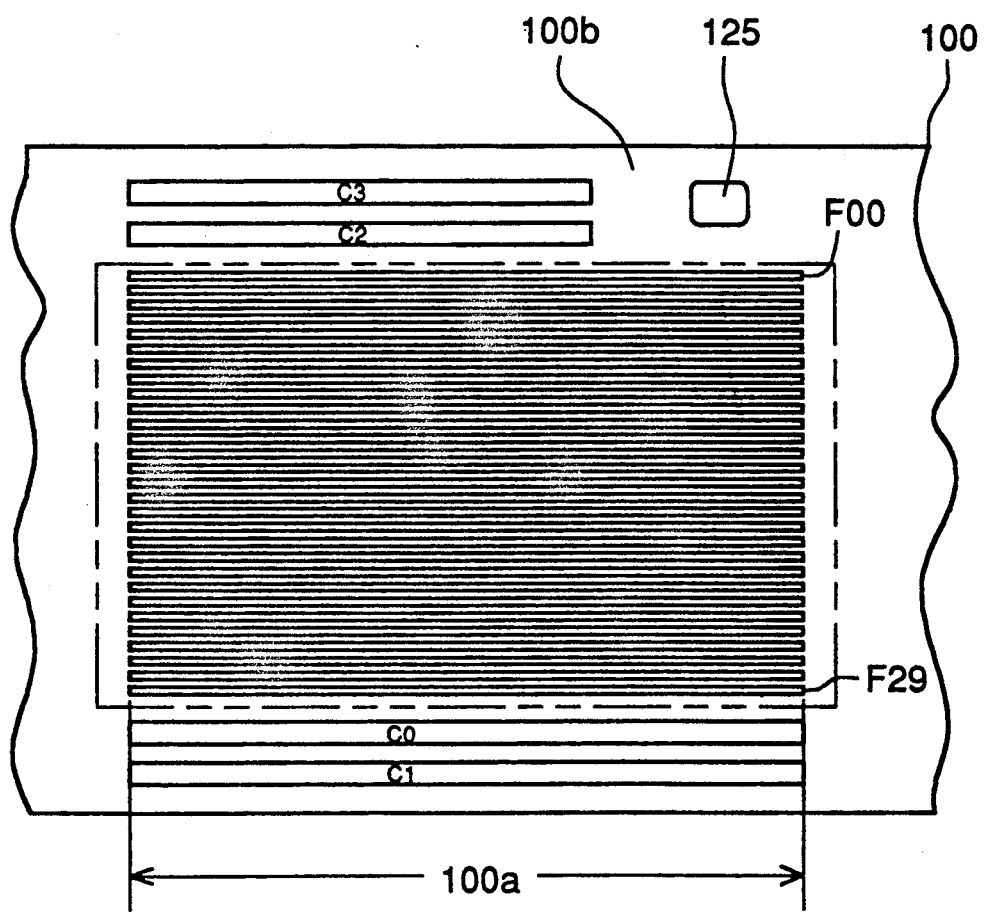
FIG. 1

FIG. 1 is a plan showing the magnetic layer, which is formed on the opposite side of the light-sensitive layer of the information recording medium of this invention. In the figure, magnetic tracks F00 to F29, for example, are provided along film strip 100 in every frame 100a. Further, external magnetic tracks C0 to C3 may be provided outside the frame.

Figure 2A:
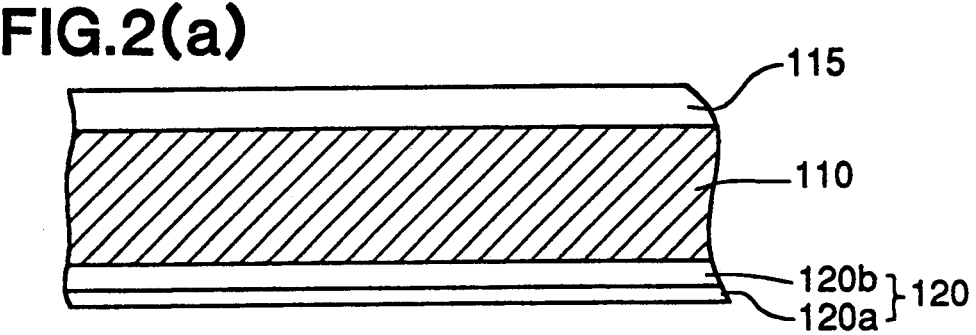

FIG. 2(a) is a sectional view of the information recording medium. In this figure, light-sensitive layer 115 are seen on one side of the support, while magnetic layer 120 comprised of upper layer 120a and lower layer 120b on the other side.

Figure 2B:
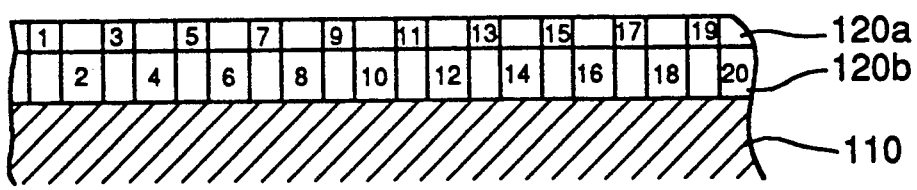
Figure 2C:
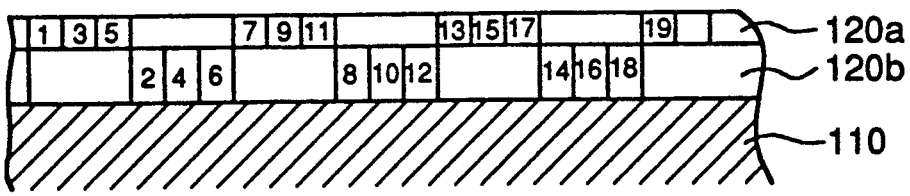

On upper magnetic layer 120a with a higher coercive force, there can be recorded data concerning the shooting sites, dates, comments on shooting (names of persons, flowers and buildings, and other shooting conditions) by use of a camera with a recording head (for example, one in which the head contacts a magnetic layer as described in PCT Japanese Pat. O.P.I. Pub. No. W090/04254 (PCT/US89/04368) or U.S. Pat. No. 4,947,196). On the other hand, the type of the film and printing conditions are recorded on the lower magnetic layer 120b with a lower coercive force at a processing laboratory. There are no particular constraints on systems for recording data on the upper and lower magnetic layers. As seen in FIG. 2(b) showing an enlarged sectional view of the magnetic layers, data can be recorded using the upper layer (where data are denoted by odd numbers) and the lower layer (where data are denoted by even numbers) alternately in the numerical order of, for example, 1,2,3,4, . . . 19,20. Otherwise, as FIG. 2(c) shows, data can be recorded intermittently in the numerical order of, for example, 1, 3, 5, 2, 4, 6, . . . 13, 15, 17, 14, 16, 18.

This upper-lower layer structure enables to clearly distinguish important shooting information from developing information unnecessary to users, enabling users to easily erase unnecessary information alone recorded on the lower layer.

Figure 3:
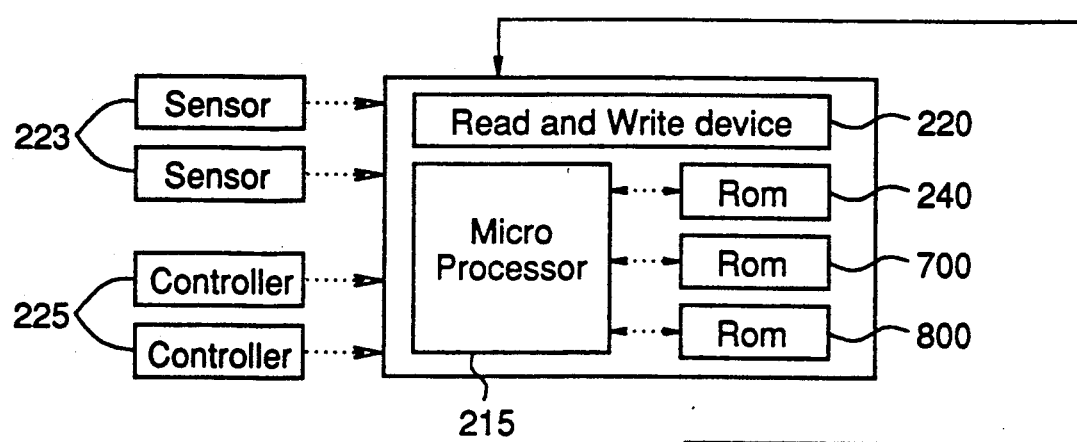
Figure 3:
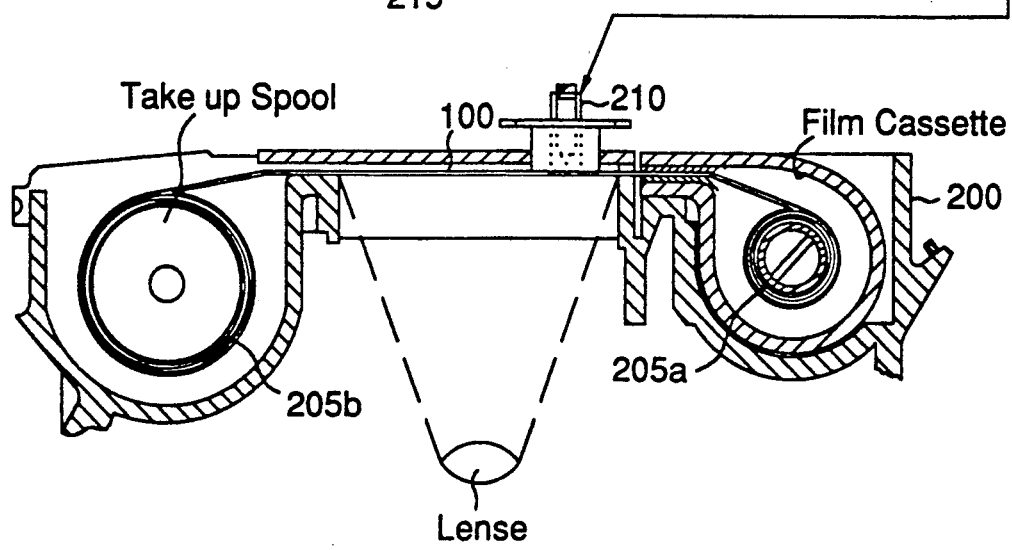

FIG. 3 is a schematic drawing of the application of this invention to the camera with a recording head described in the above U.S. Pat. No. 4,947,196. As the camera's recording head 210 also functions as a reading head, a picture to be reprinted can be immediately selected out of the negative film that stores it.

EXAMPLES

The present invention is hereunder described in detail with the examples.

EXAMPLE 1

The following magnetic paints for the upper and lower layers are coated on a sulfo-group-containing polyester base support using a simultaneous multi-layer coater illusrated in FIGS. 1 and 2 of Japanese Pat. O.P.I. Pub. No. 251265/1990.

| (Magnetic paint for the lower layer) | |
|---|---|
| $\gamma$-$Fe_2O_3$ | 5 parts by weight |
| (major axis: 0.3 $\mu$m, | |
| minor axis: 0.03 $\mu$m, Hc = 310 oersteds) | |
| Nitrocellulose | 8 parts by weight |
| Polyurethane resin | 12 parts by weight |
| Lauric acid | 1 parts by weight |
| Oleic acid | 1 parts by weight |
| Butyl stearate | 1 parts by weight |
| Cycrohexanone | 60 parts by weight |
| Methylethyl ketone | 120 parts by weight |
| Toluene | 120 parts by weight |
| (Magnetic paint for the upper layer) | |
| Co-coated $\gamma$-$Fe_2O_3$ | 5 parts by weight |
| (major axis: 0.2 $\mu$m, | |
| minor axis: 0.02 $\mu$m, Hc = 700 oersteds) | |
| Nitrocellulose | 8 parts by weight |
| Polyurethane resin | 12 parts by weight |
| Myristic acid | 1 parts by weight |
| Stearic acid | 1 parts by weight |
| Butyl stearate | 1 parts by weight |
| Cyclohexanone | 60 parts by weight |
| Methylethyl ketone | 120 parts by weight |
| Toluene | 120 parts by weight |

A 0.2-$\mu$ thick upper magnetic layer and a 0.9-$\mu$ thick lower magnetic layer were formed through the processes of coating, orientation, drying and calendaring.

Information recording medium 1 was prepared by coating emulsions for color negative on the opposite side of the magnetic layers formed on the above polyester base support.

EXAMPLE 2

Magnetic paints were prepared in the same manner as in Example 1, except that the nitrocellulose and the polyurethane resin respectively used in the magnetic paint for the upper layer and that for the lower layer were changed as follows: 8 parts by weight of the nitrocellulose was replaced with 12 parts by weight of a vinyl chloride copolymer containing potassium sulsonate groups, and 12 parts by weight of the polyurethane resin was replaced with 8 parts by weight of a polyurethane resin containing sodium sulfonate groups.

Information recording medium 2 was then prepared by coating these magnetic paints on the polyester base support the same manner as in Example 1, followed by the same procedure as in Example 1.

EXAMPLE 3

Information recording medium 3 was obtained in the same manner as in Example 2, except that a magnetic paint for the upper layer was prepared using a barium ferrite magnetic powder (Co, Ti-substituted type, average particle size: 0.13 $\mu$m, Hc: 680 oersteds)

The information recording medium thus obtained can record, on the spot, data on shooting sites, shooting dates, and other comments by use of a camera having a recording head for the upper magnetic layer with a higher coercive force, while information on the type of film and printing conditions can be recorded at a processing laboratory by means of a recording head for the lower magnetic layer with a lower coercive force.

Since the recording head of the camera also functions as a reading head, pictures to be reprinted can be readily selected out of a negative film preserved, so that negative films kept on the shelf can be used effectively.

Information recording media 1, 2, 3 were evaluated, together with the following comparative information recording medium, for adhesion of the coated layers, effect on development of color negatives, and sticking to the emulsion layer. The results are shown in Table 1. (Comparative information recording medium)

An information recording medium having a single magnetic layer was prepared by coating the magnetic paint for the lower magnetic layer of Example 1 to a dry thickness of 1.1 μm in the same manner as in Example 1, with a extrusion coater for single-layer coating. On this information recording medium, information recorded thereon relating to photographing by means by a camera has been lost in the case of writing of information thereon relating to development of the recording medium, thus, important information relating to photographing has been lost.

TABLE 1

| Recording Medium | Adhesion of Coated Layer | Effect on Development of Negatives | Sticking to Emulsion Layer | Coercive Force (in oersteds) | Preservation of information for photographing |
|---|---|---|---|---|---|
| Example 1 | A | not observed | not observed | Upper Layer 730 Lower layer 390 | o |
| Example 2 | B | not observed | not observed | Upper Layer 740 Lower layer 400 | o |
| Example 3 | B | not observed | not observed | Upper Layer 750 Lower layer 400 | o |
| Comp. Example | C | not observed | observed | 390 | x | o: Preserved
x: Lost

What symbols denote

| | |
|---|---|
| F00–F29 | magnetic tracks |
| C0–C3 | exterior magnetic tracks |
| 100 | 35 mm-wide film strip |
| 100a | one frame of film strip |
| 100b | edge of film strip |
| 110 | substrate |
| 115 | individual (multiple) light-sensitive layers |
| 120 | magnetic layers |
| 120a | upper magnetic layer |
| 120b | lower magnetic layer |
| 200 | camera |
| 205a, 205b | reels |
| 210 | read/write head |
| 215 | microprocesor |
| 220 | read/write electric element |
| 225 | control |
| 230 | sensor |
| 240, 700, 800 | ROM11 |

What is claimed is:

1. An information recording medium for use in a camera comprising an image forming system and at least one magnetic recording head, said medium comprising;
a base having a first surface and a second surface, at least one silver halide light-sensitive layer being provided on said first surface; and at least two magnetic layers comprising iron-containing ferromagnetic powder and a binder being provided on said second surface, a coating amount of ferromagnetic powder in each of said at least two magnetic layers being 10 mg or less per 100 cm², based on iron weight, said ferromagnetic powder being a material selected from the group consisting of γ-Fe$_2$O$_3$, Co-coated γ-Fe$_2$O$_3$, Co-coated Fe$_3$O$_4$, Co-coated FeOX wherein $4/3 < X < 3/2$, other iron oxides containing Co, and hexagonal ferrite magnetic powders, including Ba ferrite, Sr ferrite, Pb ferrite, and M-type and W-type Ca ferrite, said at least two magnetic layers including an outermost magnetic layer having a coercive force of 600 to 2000 Oersteds, and at least one inner magnetic layer having a coercive force of 200 to 800 Oersteds, the coercive force of said outermost layer being at least 100 Oersteds more than that of said inner layer, said outermost magnetic layer being adapted to receive information from said recording head of said camera, said inner magnetic layer being provided with film processing and printing information, said inner magnetic layer being adapted to allow erasure of information stored thereon more easily than information on said outermost magnetic layer, whereby, after processing, information on said inner magnetic layer can be erased, while information on said outermost magnetic layer is retained.

2. The information medium of claim 1, wherein said hexagonal ferrite magnetic powders is represented by Formula I, Formula I $$AO \cdot n \ (Fe_{1-m}M_m)_2O_3$$

wherein A represents an element selected from the group consisting of Ba, Sr, Ca and Pb, M represents an element selected from the group consisting of Zn, Co, Ti, Ni, Mn, In, Cu, Gd, Nb, Sn, Zr, Hf and Al, m represents an integer of 0 to 2, n represents a number from 5.4 to 6.0.

3. The information medium of claim 2, wherein the crystal form of said hexagonal ferrite magnetic powder is a hexagonal plate and the grain size of said hexagonal ferrite magnetic powders is within the range of 0.005 to 0.3 μm and the ratio of diagonal length to thickness of the hexagonal plate is within the range of 2 to 10.

4. The information medium of claim 1, wherein an outermost magnetic layer thickness of said at least two magnetic layers is not more than at least one inner magnetic layer thickness of said at least two magnetic layers.

5. The information medium of claim 1, wherein the total thickness of said magnetic layers is 1.5 μm or less.

6. The information medium of claim 1, wherein the outermost layer thickness of said magnetic layers is 0.5 μm or less.

* * * * *